D. S. DARLING.
Horseshoe.

No. 200,180. Patented Feb. 12, 1878.

Witnesses:
Geo. H. Graham
J. L. Coombs

Inventor:
Daniel S. Darling
By James L. Norris
Atty.

UNITED STATES PATENT OFFICE.

DANIEL S. DARLING, OF BROOKLYN, NEW YORK.

IMPROVEMENT IN HORSESHOES.

Specification forming part of Letters Patent No. 200,180, dated February 12, 1878; application filed February 1, 1876.

*To all whom it may concern:*

Be it known that I, DANIEL S. DARLING, of Brooklyn, in the county of Kings and State of New York, have invented certain new and useful Improvements in Horseshoes, of which the following is a specification:

This invention relates to certain improvements in detachable horseshoes, its object being to produce a shoe which may be readily applied to a horse's hoof and securely fastened thereon, and which can be removed at pleasure to relieve the foot, and to allow the hoof to grow and expand naturally when the horse is idle, for the purpose of preventing the diseases and deformities of the hoof and foot consequent upon the use of the ordinary permanently-secured shoe.

The invention consists of a shoe conforming, as usual, with the sole of the horse's hoof, and provided in front with a toe-clip projecting upward, to which is secured a flexible flat fore strap, the upper end of which is looped and secured around a clamp embracing the upper part of the hoof, the rear ends of which pass through heel-plates projecting obliquely upward at the ends of the shoe, and secured thereto by means of screw-nuts, the shoe being provided with two upwardly-projecting abutments or hoof-stops, which sit in recesses formed in the wall of the hoof, and prevent the shoe from being forced forward, or the heel of the hoof from being improperly bound in contact with the heel-plates, as more fully hereinafter set forth and described.

Figure 1:
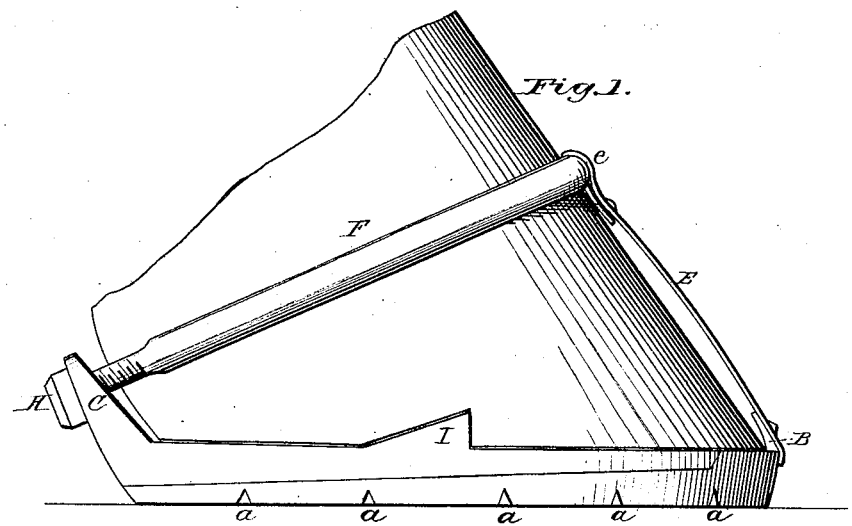
Figure 2:
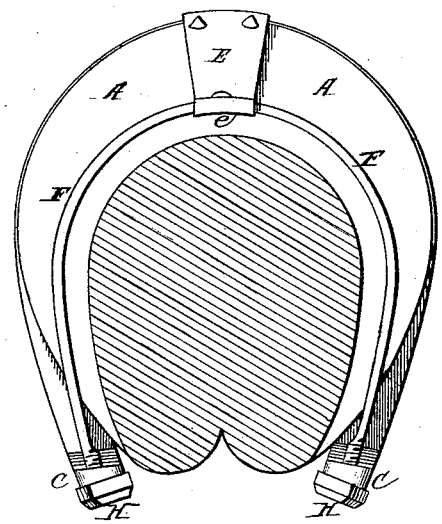
Figure 3:
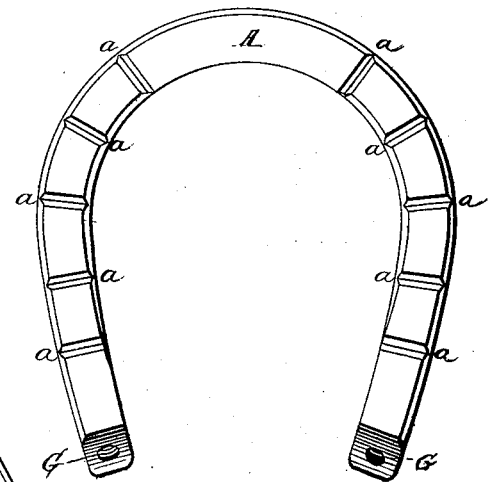

In the drawings, Figure 1 represents a side elevation of a horse's hoof and foot with my improved shoe attached thereto. Fig. 2 represents a view, looking down upon the hoof and foot, showing my improved shoe attached thereto. Fig. 3 represents a bottom view of the shoe; and Fig. 4, a detached view of the shoe, showing a modification of the method of attaching the fore strap to the upwardly-projecting abutment or toe-clip of the shoe.

Figure 4:
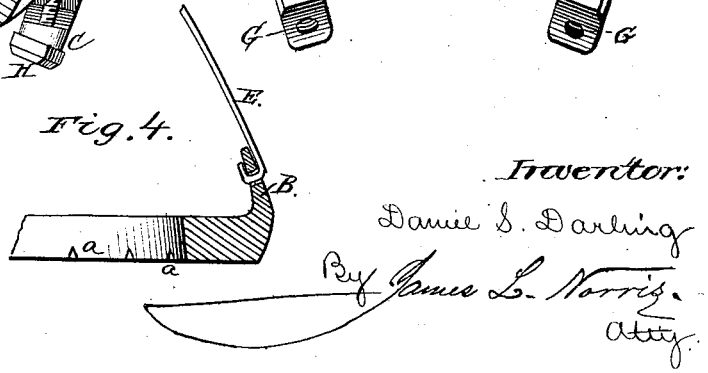

The letter A represents the horseshoe, constructed of iron or steel, of any desired width or thickness, and of proper shape to conform to the configuration of the sole of the hoof. The lower surface of the shoe is preferably formed with grooves or recesses $a$, and of any desired number and of convenient depth, extending transversely across the same at suitable intervals apart. The two spaces at the toe of the shoe are generally made about three inches apart, measuring around the front of the shoe, and those behind are generally arranged at equal distances apart, and are triangularly-shaped, extending into the shoe for about half the thickness of the same. Said spaces generally vary in number from eight to twelve, according to the size of the shoe. The inner and outer edges of the shoe are beveled to the extent of about the eighth of an inch, except at a point at or about the center or front of the shoe, where the edges are left nearly or quite straight, which form enables the shoe to securely gripe the roadway. Upon the front of the shoe is formed an upwardly-projecting abutment, B, and on each end, at the rear or heel, a projection, C, extending upward obliquely at an angle corresponding, or nearly corresponding, to the angle formed naturally by the rear of the hoof and foot of the horse. To the abutment B, at the front of the hoof, is securely attached a flexible flat fore-strap, E, formed of sheet metal, preferably of steel, and provided with a loop, $e$, at its upper end, which sits over the clamp F, embracing the upper part of the hoof or foot. Said fore-strap is secured to the abutment in any convenient manner, either by forging or welding it to the same, by means of rivets, or by passing it through a horizontal slot in the same, as shown in Fig. 4, forming a hinged joint, as may be desired. The obliquely-projecting ends of the shoe, at the rear or heel of the same, are provided with suitable apertures G, through which the ends of the clamp F project, and to which they are secured by the screw-nuts H, sitting over the said ends, which are suitably threaded for the purpose.

The letters I I represent triangular abutments or projections, extending upward from the upper face of the shoe, which are adapted to fit into similarly-shaped recesses in the lower edge of the hoof, formed for the purpose, and prevent the hoof and foot from being drawn backward by the action of the clamp and screw-nuts thereon, and injuring the rear or heel of the foot by the binding of the projecting heel-plates against the same.

The clamp or clevy F is formed with a semioval section, of iron or steel, of sufficient thickness to give it suitable strength, and at the same time allow of sufficient flexibility to enable it to properly embrace the hoof, and to provide against any abrasion of the hoof. Said clamp may be kept out of direct contact with the same by means of an interposed strip or band of rubber or other elastic or yielding packing.

The apertures in the oblique heel-plates should be sufficiently large to afford easy play for the ingress and egress of the ends of the clamp or clevy, in order that the screw-threads on the same will not be bruised or injured by use; and suitable rubber or other elastic washers are interposed between the nuts and the heel-plates, to relieve the clevy or clamp from any undue strain and prevent injury to the hoof.

The shoe-plate which forms the base, in combination with the fore-strap projecting upward therefrom at an angle to the same, and conforming to the front plane of the hoof, with the front sides of the angular abutments or hoof-stops on the upper face of the shoe, are all arranged at such relative angles to each other as to form an efficient bearing for that part of the hoof, and secure the front portion of the shoe securely thereto, while the upwardly-projecting oblique heel-plates, in combination with the clamp or clevy attached thereto by means of the screw-nuts, securely fasten the shoe to the rear portion of the hoof, the angular abutments or hoof-stops on the shoe effectually preventing any injurious strain upon the heel of the foot and rear portions of the hoof.

Strips of felt or other yielding packing may be interposed between the shoe and hoof, to prevent friction on the surfaces and relieve concussions.

Having thus described my invention, what I claim, and desire to secure by Letters Patent, is—

The horseshoe A, formed with the central triangular projections I I, the vertical toe-projection B, and oblique heel-projections C C, in combination with the clamp F, having screw-threaded ends passing through the heel-projections, and held by nuts H, and the flexible flat strap E, attached to the toe-projection at one end and looped around the clamp F at its other end, as and for the purpose described.

In testimony that I claim the foregoing I have hereunto set my hand in the presence of the subscribing witnesses.

DANIEL S. DARLING.

Witnesses:
W. A. MATHIS,
CHAS. TINNEY.